Feb. 20, 1923.
Re. 15,549
G. D. GALLAGHER
HANDLAMP
Original Filed Nov. 15, 1921
Fig. 1,
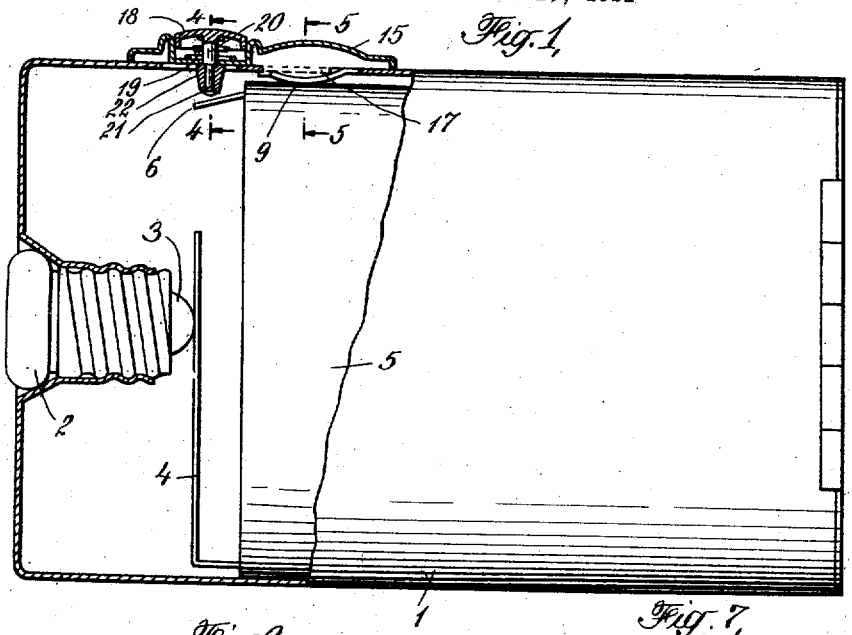
Fig. 2
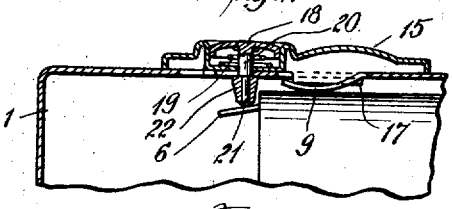
Fig. 7,
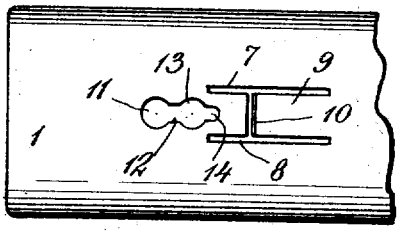
Fig. 3,
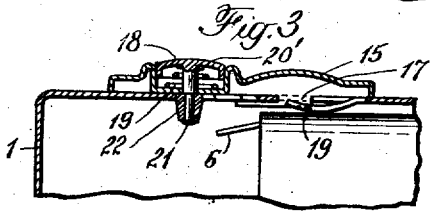
Fig. 8
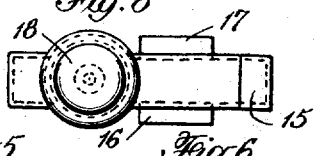
Fig. 4,
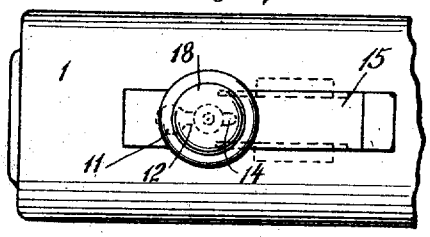
Fig. 5,
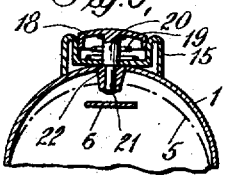
Fig. 6,
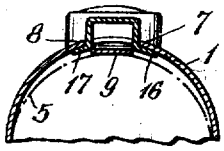
INVENTOR
George D. Gallagher
BY
Pennie, Davis, Marvin & Edmonds
ATTORNEYS Reissued Feb. 20, 1923. Re. 15,549

UNITED STATES PATENT OFFICE.

GEORGE D. GALLAGHER, OF WASHINGTON, DISTRICT OF COLUMBIA, ASSIGNOR TO WINCHESTER REPEATING ARMS COMPANY, OF NEW HAVEN, CONNECTICUT, A CORPORATION OF CONNECTICUT.

HANDLAMP.

Original No. 1,396,828, dated November 15, 1921, Serial No. 387,277, filed June 8, 1920. Application for reissue filed September 21, 1922. Serial No. 589,717.

*To all whom it may concern:*

Be it known that I, GEORGE D. GALLAGHER, a citizen of the United States, residing at Washington, District of Columbia, have invented certain new and useful Improvements in Handlamps; and I do hereby declare the following to be a full, clear, and exact description of the invention, such as will enable others skilled in the art to which to appertains to make and use the same.

The present invention relates to battery hand lamps of the kind in which a battery and a small incandescent lamp are mounted in a casing, together with suitable switch mechanism for controlling the flow of current from the battery through the lamp.

The objects and advantages of the present invention will become clear from the following detailed description, taken in conjunction with the accompanying drawings, wherein one embodiment of the present invention is described and illustrated.

In the drawings, Fig. 1 is a fragmental, sectional elevation of a complete hand lamp of the flat or vest pocket type; Fig. 2 is a fragmental, longitudinal section showing the switch mechanism closed; Fig. 3 is a similar view with the switch mechanism in safety position; Fig. 4 is a plan view of the switch mechanism; Fig. 5 is a section on the line 5—5 of Fig. 1; Fig. 6 is a similar section on the line 6—6 of Fig. 1; Fig. 7 shows the slots cut in the side of the metal case; and Fig. 8 is a plan view of the housing by which the push-button contact is moved along the double key hole slot of Fig. 7.

In the embodiment illustrated, the hand lamp comprises a casing 1, which may be of metal and flat, as shown. At the front end of this case, and threaded thereto, is a lamp 2, the inner terminal 3 of which makes contact with the longer terminal 4 of a battery 5 positioned within the case. This battery has a short, exposed terminal 6 at which the battery circuit through the lamp is controlled. One of the rounded edges of case 1 is cut or punched to form guideways 7 and 8 (Fig. 7), and a tongue or finger 9 between these guideways is severed at its front edge 10 but left integral with the case at its rear end and is pushed down into the position shown in Fig. 1 to serve as a resilient battery retaining finger. This finger not only positions the battery within the case, but keeps it from rattling around. There is also provided a double key hole slot (see Fig. 7) consisting of a large round opening 11, a narrower opening 12, a second large round opening 13, and a narrow bottom opening 14.

Mounted to slide along casing 1 is a thumb-actuated housing 15 having integral tangs 16 and 17 for engagement with slots 7 and 8, respectively, and having an enlarged round pocket, or cup, pressed from the metal of the housing and in which are housed a push-button 18 and its coiled spring 19. The push button has a central stud 20, the lower end 21 of which is of reduced cross-section to receive a tapered enlargement 22. The enlargement may be conveniently held in position by riveting over the lower end of element 21. The push-button contact, so constituted, is movable by thumb pressure into and out of engagement with the exposed terminal 6 of the battery to control the flow of current from battery 5 through lamp 2, but the sliding movement of the housing and the cooperation of the double key hole slot with the enlargement on the push-button, effect new and desirable results.

With the switch mechanism positioned as in Fig. 1, the enlargement of the push-button contact rests in the enlargement 13 (Fig. 7) of the key hole slot, and the expansion of spring 19 holds this enlargement against the end face of the housing. In this position the push-button contact is not in engagement with the exposed battery terminal 6, but by thumb pressure can be pushed into engagement with that terminal, as for momentary flashing of the lamp in signaling. If continuous burning of the lamp is desired, the operator first depresses the push-button to move enlargement 22 out of locking engagement with opening 13 of the key hole slot and then with his thumb pulls back on the housing to slide it downward along the case, thereby moving enlargement 22 into the narrowed lower portion 14 of the double key hole slot, and at the same time bringing the push button stud into continuing engagement with battery terminal 6. Then, if the push-button be released by removal of the thumb, the lamp will continue to burn with enlargement 22 frictionally engaging the inner surface of the case immediately adjacent to the lower narrow portion 14 of the double key hole slot. Then, if the operator wishes to extinguish the light, he can merely push forward with his thumb on the housing 15 until enlargement 22 snaps into the enlarged portion 13 of the slot, thereby opening the circuit at contact 6.

But in addition to being able to flash the lamp, as in signaling and to burn the lamp continuously without continuing thumb pressure on the button, the present device has the advantage that the switch mechanism can be put in such condition that inadvertent lighting of the lamp, as when the lamp is being shipped or carried about, is in large measure, avoided. To move the switch mechanism to safety position, it is necessary to depress the thumb button, thereby disengaging enlargement 22 from the part of the slot marked 13 in Fig. 7, and to push the housing forward along the case until the enlargement snaps into the enlarged portion 11 of the double key hole slot. Battery terminal 6 is so positioned with respect to the key hole slot, that when enlargement 22 is in opening 11, it will be beyond the end of terminal 6. Under these conditions, thumb pressure on button 18 will not close the circuit, because stud 21 will not touch battery terminal 6. Furthermore, backward sliding movement of the housing is prevented because of the locking engagement between enlargement 22 and the opening 11. Therefore, to change the switch mechanism from this safety position to one in which the lamp can be lighted, it is necessary, first, to depress the push-button and then pull back on the housing until enlargement 22 snaps again into opening 13. So complex a manipulation is not likely to happen accidentally, and the lamp can readily be shipped or carried about with its battery in position, and without danger of accidentally burning the lamp to no useful purpose.

Although the embodiment illustrated in the drawing and above described is of the flat or vest pocket type, it will be understood that I contemplate such changes in arrangement and in detail as are reasonably within the scope of my invention, as defined by the appended claims.

I claim:

1. In a battery hand lamp, the combination of a battery case, a housing mounted to slide longitudinally thereof, a spring, and a spring pressed push button contact mounted on said housing and slidably movable therewith, substantially as described.

2. In a battery hand lamp, the combination of a metal case having longitudinal slots therein, a housing mounted to slide in said slots, and a spring and spring pressed push button contact, movable along said case, with said housing, substantially as described.

3. In a battery hand lamp, the combination of a battery case having a slot, a housing mounted to slide longitudinally along said case and a spring and spring pressed push-button contact carried by said housing and movable along said slot, substantially as described.

4. In a battery hand lamp, the combination of a battery case having a longitudinal key hole slot, a battery therein having an exposed terminal, a housing mounted to slide longitudinally along said case, a spring and a spring pressed push-button contact carried by said housing and movable along said slot into and out of engagement with said exposed battery terminal.

5. In a battery hand lamp, the combination of a battery case having a longitudinal key hole slot, a battery therein having an exposed terminal, a housing mounted to slide longitudinally along said case, a spring pressed push button contact carried by said housing and having a shoulder for continuously engaging the lower end of said key hole slot when continuing connection with said battery terminal is desired.

6. In a battery hand lamp, the combination of a battery case having a double longitudinal key hole slot, a battery within said case having an exposed terminal, a housing mounted to slide along said case, a spring pressed push-button contact carried by said housing and movable along said slot, said push-button contact having an enlargement engageable with either enlarged portion of the double key hole slot to prevent sliding movement of said housing except when said push-button contact is manually depressed.

7. In a battery hand lamp, the combination of a battery casing having a double longitudinal key hole slot, a battery therein having an exposed terminal, a housing mounted to slide along said case, a spring pressed push-button contact carried by said housing and movable in said slot, said push-button contact having an enlargement preventing sliding movement of said housing except when said push-button contact is depressed, said enlargement being adapted to engage beneath the narrow end of said slot when continuing contact with the exposed battery terminal is desired.

8. In a battery hand lamp, the combination of a metal battery case, a housing mounted to slide thereon and a resilient, battery positioning finger stamped from said case beneath said sliding housing, substantially as described.

9. In a battery hand lamp, a casing, a battery therein, an electric bulb, and electric connections between the battery and bulb, including a guide portion at the exterior of the casing disposed longitudinally of the latter, a slide member mounted on said guide portion for forward and rearward movement, a spring-pressed button bodily carried by said slide, contact means cooperating with said button in two distinct positions of the slide on said guide portion for establishing flashing contact and permanent contact respectively, said slide being movable to a third or safety position wherein the button is remote from the contact means, and means for locking the slide and button in the safety position.

10. In a battery hand lamp, a casing, a battery therein, an electric bulb, and electric connections between the battery and bulb, including a guide portion at the exterior of the casing disposed longitudinally of the latter, a slide member mounted on said guide portion for forward and rearward movement, a spring-pressed button bodily carried by said slide, contact means cooperating with said button in two distinct positions of the slide on said guide portion for establishing flashing contact and permanent contact respectively, said slide being movable to a third or safety position wherein the button is remote from the contact means, and means for locking the slide and button in the safety position, said locking means being releasable only upon depression of said button.

11. In a battery hand lamp, a casing having a slotted guide portion for a slidable switch member, a slidable switch member guided thereby adapted to be shifted manually, a depressible self-returning contact button mounted in and carried by said sliding member and having a contact shank projecting toward the interior of the casing and co-operating means on the button shank and guide portion and controlled by the in and out movement of the button for locking the button and thereby its sliding carrier member against longitudinal movement.

12. In a battery hand lamp, a casing having a slotted guide portion for a slidable switch member, a slidable switch member guided thereby adapted to be shifted manually, a depressible self-returning contact button mounted in and carried by said sliding member and having a contact shank projecting toward the interior of the casing and cooperating means on the button shank and guide portion and controlled by the in and out movement of the button for locking the button and thereby its sliding carrier member against longitudinal movement when the button and its carrier slide are in either of two positions, and contact means cooperating with the inner portion of the button when the latter is in one of such positions.

13. In a battery hand lamp, a casing having a slotted guide portion for a slidable switch member, a slidable switch member guided thereby adapted to be shifted manually, a depressible self-returning contact button mounted in and carried by said sliding member and having a contact shank projecting toward the interior of the casing and cooperating means on the button shank and guide portion and controlled by the in and out movement of the button for locking the button and thereby its sliding carrier member against longitudinal movement when the button and its carrier slide are in either of two positions, and contact means cooperating with the inner portion of the button when the latter is in one of such positions, said button in the other position being remote from the contact means, and said button and sliding carrier having a third position intermediate the other two in which the button can be actuated for flashing the lamp.

14. In a device such as described, a switch structure comprising a base plate, a slide movable to and fro on the base plate at the exterior thereof, and a push button contact member mounted within the middle portion of the slide and shiftable therewith to different positions.

15. In a device such as described, a switch structure comprising a base plate, a slide movable to and fro on the base plate, a push button mounted on the slide, means for completing a circuit when the slide is in either of two positions, and means for locking the slide in an inoperative position.

16. In a device such as described, a switch comprising a base plate, and a combined push button and slide structure guided on said base plate at the exterior thereof, said structure having two operative positions and a third, inoperative, position.

17. In a hand lamp, a casing, a battery therein, a bulb, electrical connections for establishing a circuit between the battery and bulb, a guide portion on the casing for mounting a sliding switch element, a sliding switch element guided by said guide portion adapted to be shifted relatively thereto by the hand of the operator, a push button contact member carried by said sliding element, and contact means to cooperate with said push button contact member, said sliding element and the push button contact member carried thereby having distinct permanent contact and safety positions relatively to the guide portion and having an intermediate position for producing flashing of the lamp.

18. In a device such as described, a casing, a battery therein, a bulb, and means for making and breaking contact between the terminals of the bulb and the battery, comprising a guide member on the casing and a combined push button and slide on said guide member slidable into three distinct positions.

19. In a device such as described, a switch comprising a slide member constructed of sheet metal and having a socket, a push button mounted in said socket, a spiral spring interposed between the bottom of the socket and the head of the push button, a fixed guide for said slide and a fixed contact located so as to be contacted by said push button when said slide is in a predetermined position relatively to said guide.

20. In a device such as described a base plate having a slotted portion, a slide mounted on the base plate, and a push button device carried by but movably mounted in the slide to be depressible independently and cooperating with the slotted portion of the base plate to lock the slide in different positions.

21. In a device of the character described, a casing member presenting a guide, a manually shiftable slide mounted on said guide and having a socket therein with a bottom perforation, a button in said socket having a shank engaging said perforation, and a spring interposed between the button head and the socket bottom, said button being carried by said slide to different positions as the latter is shifted on said guide.

22. In a hand lamp, a casing, a battery therein, a bulb, and a switch structure on the exterior of the casing for closing the circuit including the battery and bulb, embodying an elongated slide having an intermediate depression adapted to be engaged by the thumb of the operator for moving said slide, a push button carried by the slide located within said depression, so that the slide may be shifted by the thumb and the push button pushed in thereby substantially simultaneously, and contact means cooperating with the push button on the depression of the same when the slide occupies a definite position.

23. In a hand lamp, a circuit closing switch comprising a base plate having a slotted portion, a slide mounted on the base plate at the exterior thereof and adapted to be shifted by the thumb of the operator, a spring-pressed push button carried bodily by the slide but movably mounted therein so as to be depressible independently, contact means cooperating with said push button, and means cooperating with the shank of the push button and the slotted portion of the base plate to lock the slide in different positions relatively to said base plate.

24. In a hand lamp, a casing, an electric battery therein, a bulb in said casing and means for making and breaking contact between the terminals of the bulb and said battery, comprising a depressible and laterally shiftable switch button having a flash position, a safe position and a permanent light position, said button being movable from the flash position to the safe position or to the permanent position only after depression of said button.

25. In a hand lamp, a casing, an electric battery therein, a bulb in said casing and means for making and breaking contact between the terminals of the bulb and said battery, comprising a depressible and laterally shiftable switch button having a flash position, a safe position and a permanent light position, said button being movable from the flash position to the safe position or to the permanent position only after depression of said button, a manually shiftable carrier for said button, locking means for the carrier and button to secure them in the safe position and permanent light position respectively, and means for mounting said carrier and button so that the movement from flash position to permanent light position takes place in one direction, whereas the movement from flash position to the safe position takes place in the opposite direction.

In testimony whereof I affix my signature.

GEORGE D. GALLAGHER.